Oct. 1, 1940.   W. SINCLAIR   2,216,141
PRODUCTION MACHINE
Filed Aug. 8, 1939   6 Sheets-Sheet 1
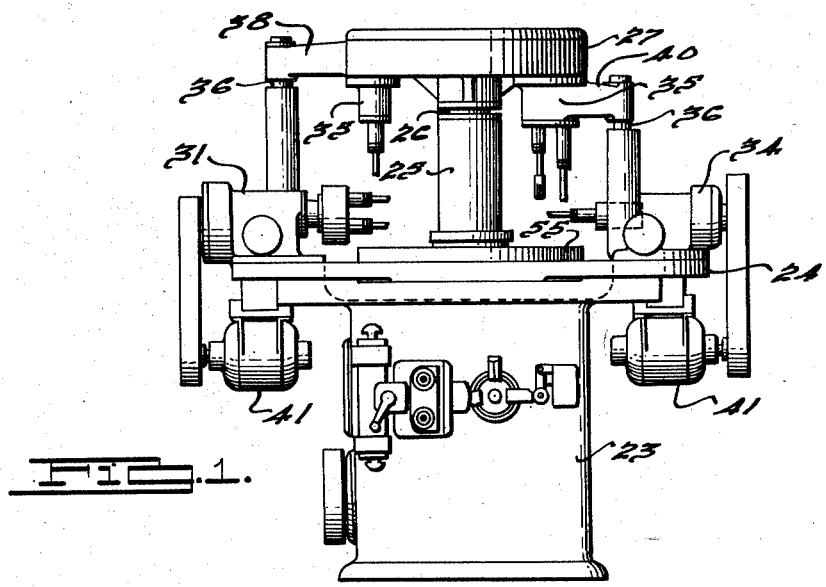
FIG. 1.
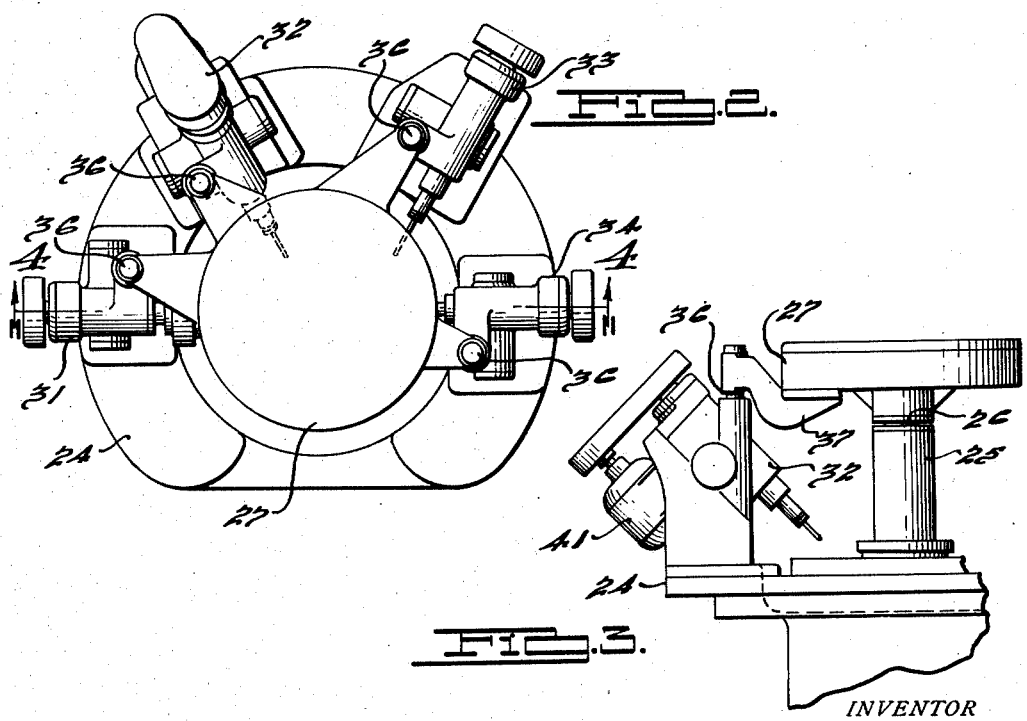
FIG. 2.
FIG. 3.
INVENTOR
William Sinclair.
BY Everett G. Wright
ATTORNEY Oct. 1, 1940.  W. SINCLAIR  2,216,141
PRODUCTION MACHINE
Filed Aug. 8, 1939  6 Sheets-Sheet 2

INVENTOR
William Sinclair.
BY Everett G. Wright,
ATTORNEY

Oct. 1, 1940.  W. SINCLAIR  2,216,141
PRODUCTION MACHINE
Filed Aug. 8, 1939  6 Sheets-Sheet 3
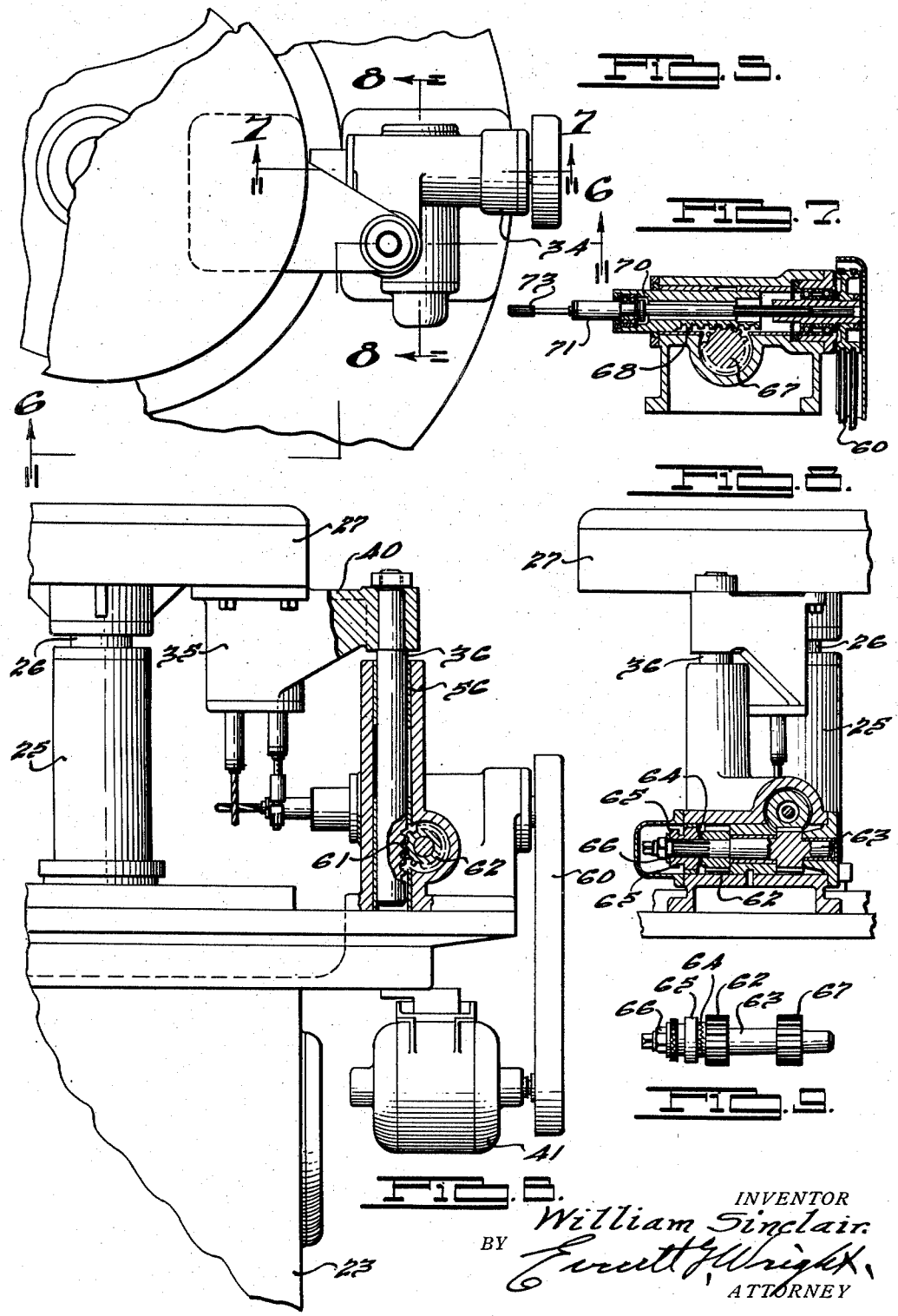
INVENTOR
William Sinclair.
BY Everett J. Wright,
ATTORNEY Oct. 1, 1940.   W. SINCLAIR   2,216,141
PRODUCTION MACHINE
Filed Aug. 8, 1939   6 Sheets-Sheet 4
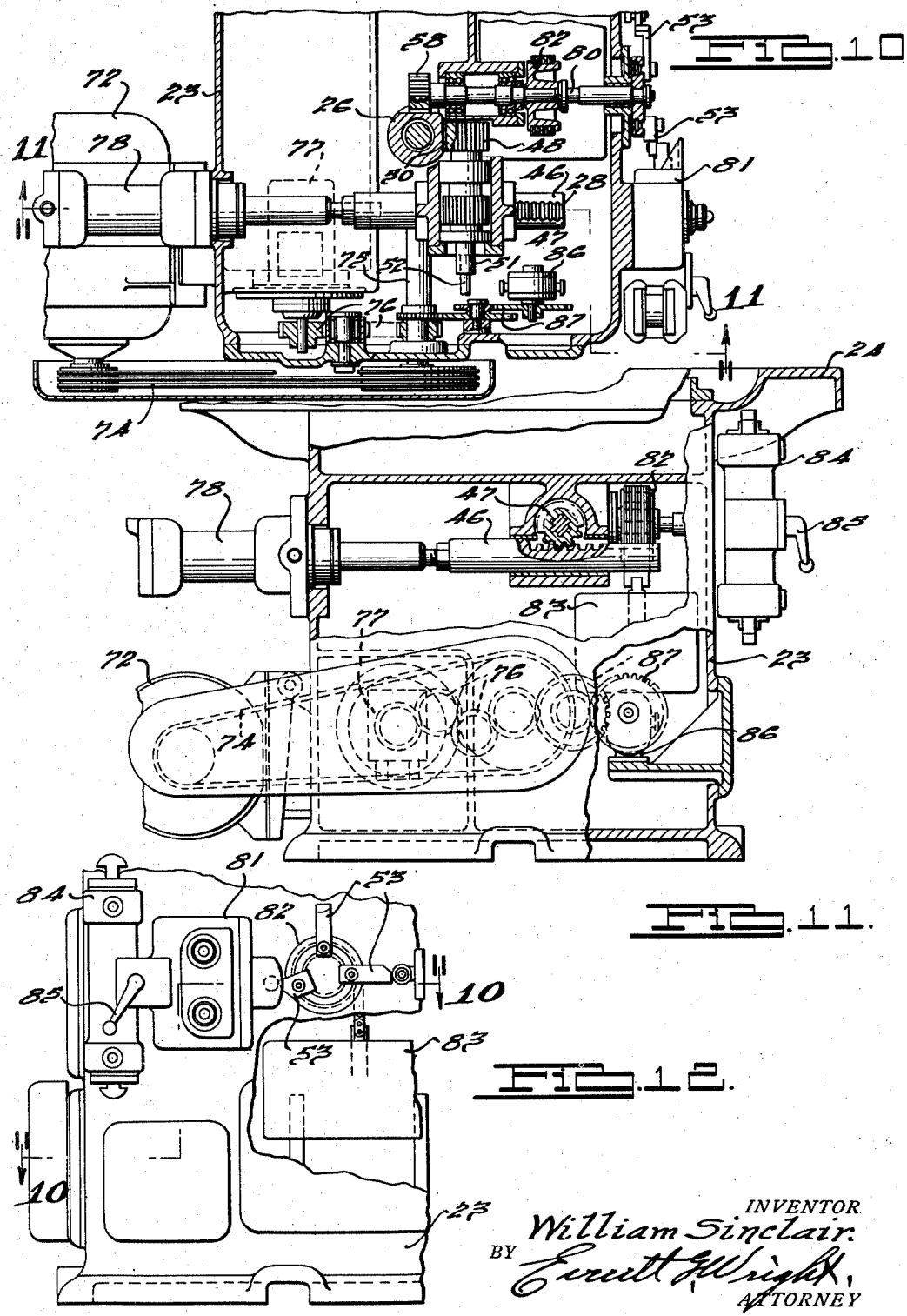

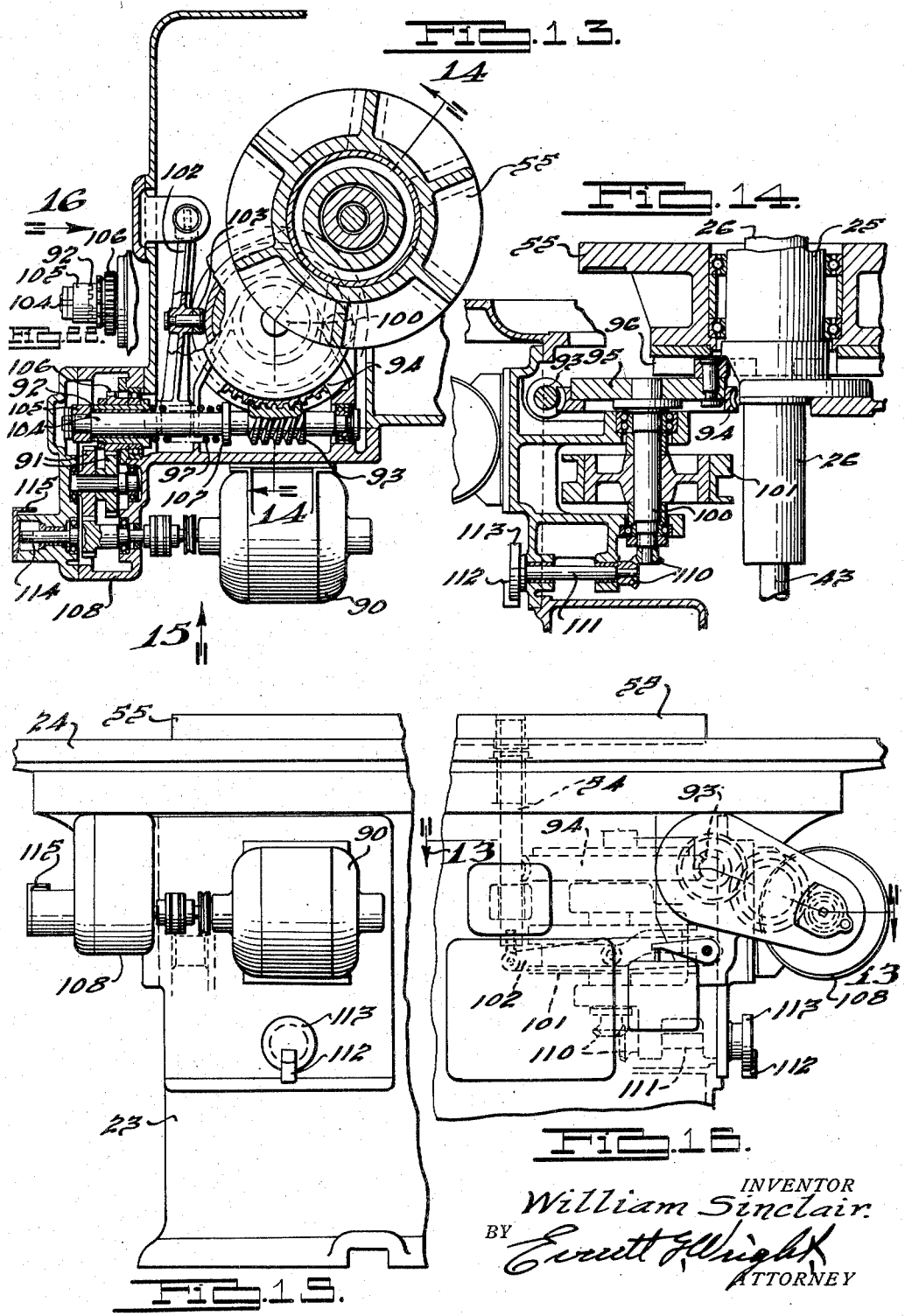

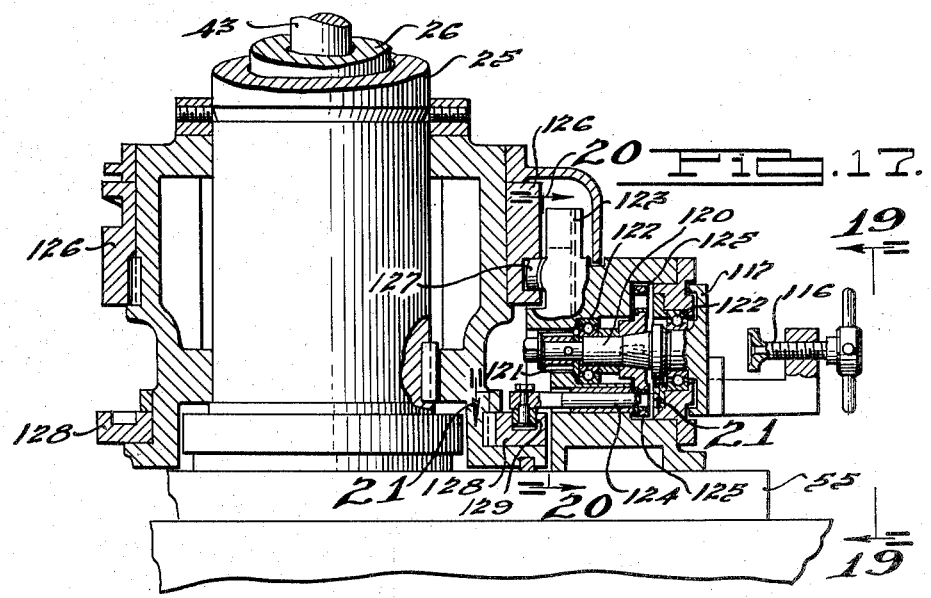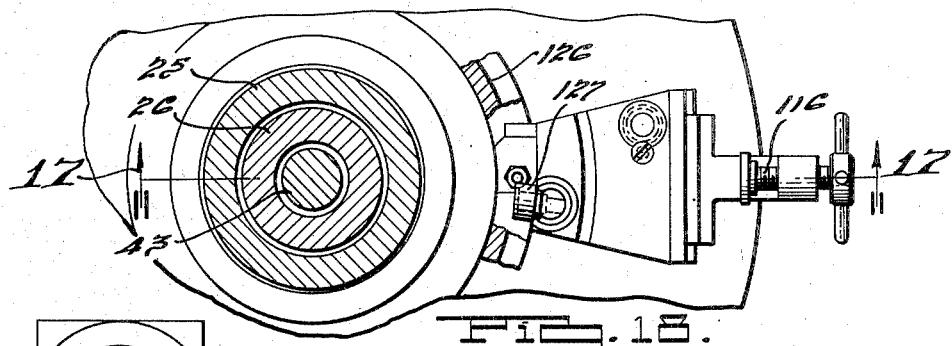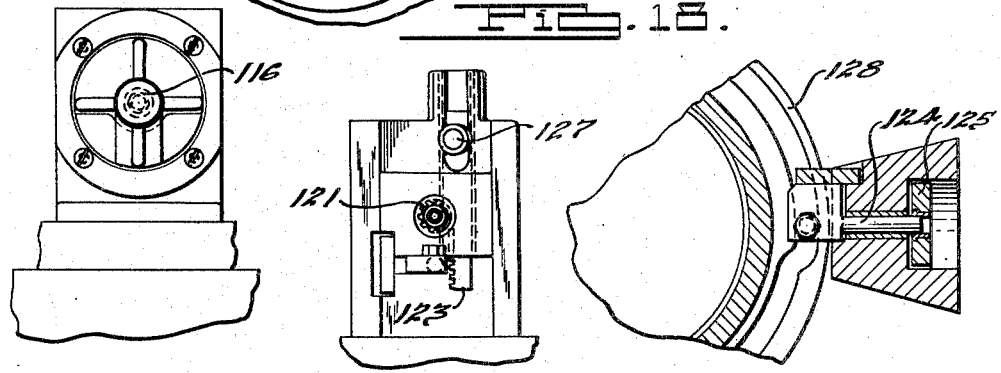

Patented Oct. 1, 1940

2,216,141

UNITED STATES PATENT OFFICE 2,216,141

PRODUCTION MACHINE

William Sinclair, Highland Park, Mich., assignor to Production Engineering Company, a corporation of Michigan Application August 8, 1939, Serial No. 289,008

10 Claims. (Cl. 29—38)

This invention relates to metal cutting and more especially to multiple spindle automatic indexing machines of the center bar type for drilling, reaming, tapping, milling and similar operations.

An object of the invention is to improve the art of metal cutting machines.

A further object is to provide multiple spindle machines adapted to perform various cutting operations on different types of work pieces with a minimum number of changes in individual cutting units.

Another object is to provide a multiple spindle machine adapted to use heavy spindles.

Another object is to provide essentially direct mechanical control of the feed of platten mounted units of a center bar type of cutting machine in synchronism with feeding movements of the center bar of such machines.

Another object is to make in such mechanical control system provision for simple and quick settings of said platten mounted units.

A further object is to provide in a center bar type of cutting machine for heavy spindle units and at the same time to dispose a plurality of such units and drive connections therefor within a restricted space.

Other objects, features and advantages of the invention will become apparent from the following description and appended claims.

The requirements that must be met in multiple spindle automatic indexing machine practice in drilling, reaming, milling and similar operations have heretofore been unfavorable to center bar type of machines. Model changes in work pieces, as for example, engine blocks, have caused large proportions of the individual unit to be periodically scrapped and major changes made in complicated and expensive control systems. Control systems also have been extended outside the machine with the result that such machines became cumbersome and unwieldly. Excessive space requirements have been necessary when heavy spindle units were employed, and excessive vibration resulted if lighter spindles were used. Also, the setting of individual units with respect to relative positions of advance of the tools thereof has been unduly complicated.

According to the present invention, a multiple spindle metal cutting machine has been made quite universal. The cutting tool units are carried at the desired station either on the under side of the vertical movable mushroom head or on a horizontal platten or table and may be readily replaced or changed to suit model and engineering changes to the work piece. Feeding control of the various units of the machine is mechanically and directly responsive to the feeding movement of the vertically movable mushroom head, and guiding means for the latter is utilized as an element in the feed control system of the platten mounted units. The mushroom head construction permits the use of heavy spindle constructions, and, at the same time, permits the desired number of such heavy spindled units together with their driving means to be included within the vertical projection of a compact mushroom head. The center bar and mushroom head also mechanically operate the counterbalance system and the control system for the hydraulic feed mechanism for the center bar and mushroom head. The platten mounted units may be readily set by an extremely simple adjustment of the mechanical feed mechanism leading from the mushroom head.

For the purpose of illustrating the genus of the invention, reference may be had to the accompanying drawings, in which:

Fig. 1 is a side elevation of a multiple spindle machine constructed in accordance with the principles of the invention.

Fig. 2 is a top plan of the mechanism shown in Fig. 1.

Fig. 3 is a side elevation of a spindle unit depicted in Fig. 2 but not shown in Fig. 1.

Fig. 5 is a top plan of the right hand spindle unit shown in Figs. 1 and 2.

Fig. 6 is a detail elevation with parts broken away to show a section taken substantially on the line 6—6 of Fig. 5.

Figure 4:
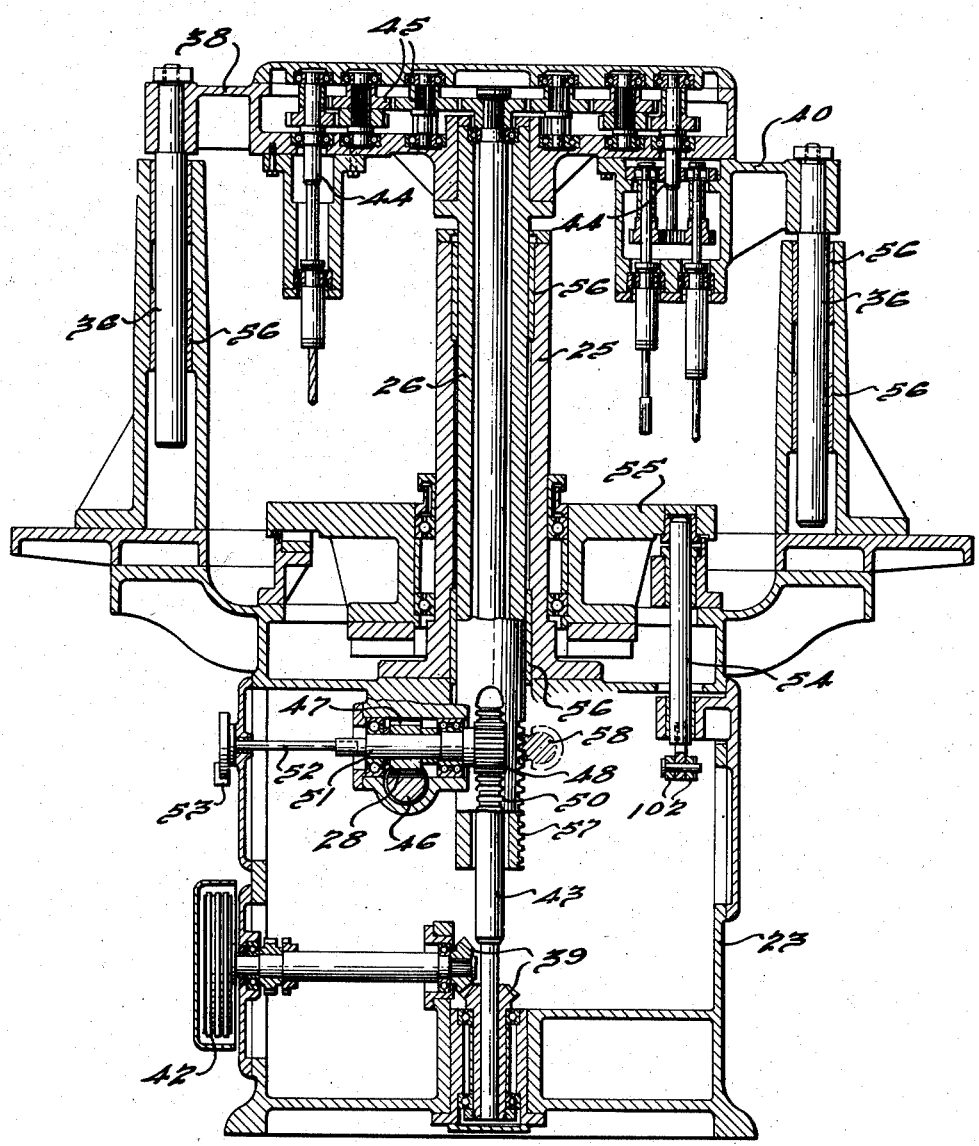
Fig. 4 is a vertical section taken substantially on the line 4—4 of Fig. 2.

Figs. 7 and 8 are vertical sections taken subtially on the lines 7—7 and 8—8 of Fig. 5.

Fig. 9 is a detail side elevation of mechanism shown in Fig. 8.

Fig. 10 is a horizontal sectional view showing mechanism associated with the base unit of the machine depicted generally in Fig. 1, the section being taken substantially on the line 10—10 of Fig. 12.

Fig. 11 is a vertical sectional view taken substantially on the line 11—11 of Fig. 10.

Fig. 12 is a detail side elevation as viewed from the right hand side of Figs. 10 and 11.

Fig. 13 is a detail horizontal section taken substantially on the line 13—13 of Fig. 16.

Fig. 14 is a detail vertical section taken substantially on the line 14—14 of Fig. 13.

Figs. 15 and 16 are side elevations taken at right angles to each other and show the arrangement of parts depicted in Figs. 13 and 14, see the arrows 15 and 16 in Fig. 13.

Fig. 17 is a vertical sectional view taken on the line 17—17 of Fig. 18.

Fig. 18 is a horizontal sectional view taken through the upper portion of the mechanism shown in Fig. 17.

Fig. 19 is a side elevation taken as indicated by the line 19—19 of Fig. 17.

Fig. 20 is a detail vertical sectional view taken substantially on the line 20—20 of Fig. 17.

Fig. 21 is a fragmentary horizontal sectional view taken substantially on the line 21—21 of Fig. 17.

Fig. 22 is a detail side elevation of mechanism shown directly therebelow in Fig. 13.

Referring to Fig. 1, a machine base 23 is provided with a platten table 24 and a center bar guide station 25 in which is disposed a vertically reciprocable center bar 26 carrying at its upper end a mushroom head 27. The machine is universal, the cutting tools being carried in separate units 31, 32, 33 or 34 mounted at each station on the horizontal platten table 24 or in vertical units 35 carried on the under side of the mushroom head 27. These units may be changed or replaced to suit model or engineering changes to the part being machined. The vertical spindles 35 are preferably fed through their work cycle hydraulically by the action of the mushroom head 27. The platten mounted units 31 to 34 inclusive are actuated through their feed cycle by means of combination rack and guide bars 36 attached to the mushroom head 27 as indicated at 37 in Fig. 3 on a part of the mushroom head casting as indicated at 38 at the upper left hand side of Fig. 1, or are attached to an arm 40 forming a part of the auxiliary head casting at the upper right hand vertical spindle unit 35 of Fig. 1. Each platten mounted unit 31 to 34 inclusive is driven by its own individual motor 41.

Referring to Fig. 4, driving power is introduced to the horizontal main drive shaft 75 by a main driving pully 42 from a suitable source of power such as an electric motor 72 shown in Figs. 10 and 11, and transferred from the said horizontal main drive shaft 75 to the vertical main drive shaft 43 by bevel gears 39 and from the vertical main drive shaft 43 to stub spline shafts 44 through suitable gearing 45 in the mushroom head 27, thus providing the rotating force of the vertical drilling unit 35. The lower end of the vertical main drive shaft 43 is preferably splined through the shank of the vertically facing bevel gear of the pair of beveled gears 39 as indicated in Fig. 4. Hydraulic power to raise and lower the mushroom head is applied to the center bar 26 through a piston 46 provided with rack teeth 28 engageable with a pinion 47 mounted on a pinion shaft 51. A second pinion 48 is also fixed to the shaft 51 and engages the teeth of a rack 50 formed on the center bar 26. Also coupled to the pinion shaft 51 is a control spindle 52 which operates through dogs 53 and limit switches, not shown, provided to stop the machine at the end of a work cycle. A push button, not shown, starts the work cycle when a finished part has been unloaded and a new part loaded in its place so that the machine is manually started and automatically stopped. An indexing table locating plunger 54 is operated in synchronism with the indexing mechanism of the machine by cam means described at a later point. An indexing table 55 is suitably journaled upon the stantion 25. The rack and guide bars 36 and the center bar 26 are of hardened and ground steel running in hardened and ground steel bushings 56. The center bar 26 is provided with a second rack 57 which cooperates with a counterweight pinion 58 for operating the counterweight sprocket 82 illustrated in Fig. 10 and described at a later point, and also, for operating mechanically the control of the cycle of the hydraulic unit for feeding the vertical spindle units.

Reference may now be had to Figs. 5 to 9 inclusive which illustrate the general arrangement of a typical platten unit such as unit 34 illustrated at the right hand side of Figs. 1 and 2. As previously indicated a spindle drive is from an individual motor 41 which may be directly coupled to the spindle shaft, geared, or as illustrated, coupled by belt means 60 to the spindle shaft of the platten mounted unit. As indicated in Fig. 6, the rack and guide bar 36 is provided with rack teeth 61 for driving a pinion 62. As indicated in Fig. 8, the pinion 62 is rotatably journaled upon a pinion shaft 63 and cooperable through serrations 64 with a clutch member 65 splined to the pinion shaft 63. A clamping nut 66 threaded to the other end of the shaft 63 locks the clutch member 65 to pinion 62 through the serration 64 for positively locking the serrated clutch. The pinion 67 is fixed to or made integral with shaft 63 and meshes with rack 68 of a quill 70 for feeding the spindle 71 in synchronism with the guide rack 36 and the main mushroom head 27. The position of advance of spindles 71 may be adjusted to suit the length of the cutting tools 73 by means of the serrated clutch 65.

Reference may now be had to Figs. 10, 11 and 12 which show the feed mechanism and the control system therefor from a main drive motor 72 to the center bar 26 of the machine. Power from motor 72 is transmitted by the V-belts 74 to a shaft 75 and from thence through gear train 76 to a pump 77 for hydraulic pressure fluid. Pressure fluid is then pumped from pressure unit 77 to either side of the piston in the hydraulic cylinder 78 which actuates piston rod 46, also shown in Fig. 4, and rack 28 which in turn actuates pinions 47 and 48. The pinion 48 meshes with rack 50 cut in the center bar 26 which feeds the mushroom head 27 up and down, as required depending onto which side of the hydraulic piston in the hydraulic cylinder 78 is receiving the pressure fluid from the pump 77.

The rapidity of approach of the tool to the work piece, the feeding rate throughout the work cycle and the rapid return to starting position is governed by the control of the hydraulic unit or pump 77 through the rack and pinion shaft 80 to which is fixed the counterweight pinion 58, also shown in Fig. 4, and feed panel control dogs 53 which alternately adjust control panel 81 to regulate the output of the hydraulic pump 77 to suit the required feed rate. The rack and pinion shaft 80 has fixed thereto a counterweight chain sprocket 82 to which is attached the main counterweight 83. The starting solenoid 84 initiates operation of the hydraulic piston electrically from a conveniently located start button, not shown, when the feed is at rest between work cycles; the lever 85 being provided as manual means for stopping or starting or reversing the feed when required, generally only used during tool setup. The drive shaft 75 also drives the lubricating pump 86 through a gear train 87 for lubricating all moving parts wherever possible, thus locating the lubricating pump means within the base of the machine.

Reference may now be had to Figs. 13 to 16 and 22 in connection with which the mechanical indexing system will be described. This system is mechanically separate from the rest of the machine and is operated by its own individual motor which is synchronized electrically with the feed cycle of the machine. When the work cycle is initiated by depressing the start button, previously alluded to, and before the cutting tools reach the work, the indexing motor 90 is put in operation and through reduction gearing 91 and a safety clutch 92 and through a worm and worm wheel mechanism 93 and 94 which rotates a Geneva cam roller plate 95 which in turn operates a Geneva cam 96 and thus indexes the table 65 the required amount which may be, for example, 4, 6, 8, 10, 12, 14 or 16 indices.

The said safety clutch 92 is mounted on the shaft 104 of the worm 93 and comprises a clutch element 105 fixed to the left hand end of the shaft 104 as viewed in Figs. 13 and 22, the clutch element 105 being provided with serrations on its right hand end face. The other clutch element 106 also forms one of the gears of the gear train 91 and is provided with serrations on its left hand face as viewed in Fig. 22, such serrations cooperating with those of the clutch element 105. The shaft 104 is provided with a shoulder flange 107 and a spring 97 is disposed in compressed condition between the said shoulder flange 107 and the clutch element 106 so that it normally maintains the serrations of clutch element 105 and 106 in engagement with each other. The clutch element 106 is journaled for free rotation with respect to the shaft 104 that is retained from axial movement by suitable bearing means connecting the same to a housing 108 for the gear train 91 and safety clutch 92. It is noted that in the event the indexing mechanism should jam and the worm wheel 94 fail to turn for any reason, the worm 93 will feed back, forcing shaft 104 to the left as viewed in Fig. 13, carrying with it the clutch element 105 to disengage the serrations of the latter with respect to the serrations of the clutch element 106. This releases the safety clutch 92 and prevents breakage or damage to the indexing mechanism.

The said worm wheel 94 is mounted on worm wheel shaft 100 and attached to this shaft is a drum cam 101 which oscillates a lever 102 to cam roller 103 to withdraw the indexing table locating plunger 54 which is pivotally connected to the left hand end of lever 102 as viewed in Fig. 16. The withdrawal of the indexing table locating plunger 54 takes place during the time when the Geneva cam roller 103 is traveling idle and before it actually contacts the Geneva cam 96 and starts indexing operation. The worm wheel shaft 100 also drives two beveled gears 110 and a control shaft 111 at the end of which are provided an end plate 113 and a control dog 112, the latter being provided to stop the motor 90 during the balance of the work cycle of the machine. The shaft of motor 90 extends through the housing 108 and is provided with a wrench engaging end 114 for hand indexing during tool setup. A safety cover 115 is provided for covering the wrench receiving end 114 of the shaft of the indexing motor 90.

Referring to Figs. 17 to 21 inclusive, there is shown an arrangement of an automatic rotary holding fixture for use in the above machine for work requiring various machining operations which ordinarily cannot be reached on a machine of this type. The work piece is loaded into a locating fixture, not shown, and hand clamped by means of a screw clamp 116, or any desired clamping means, and, as the machine indexes from station to station, such locating fixture is automatically rotated presenting a new face to the vertical tool holding spindle at each station. Such holding fixture, not shown, is mounted on the fixture holding face plate 117 which is integral with the locating plate shaft 120 and a pinion 121 is keyed to the opposite end of such shaft. The shaft 120 and pinion 121 are free to rotate in heavy duty anti-friction bearings 122 and this assembly is actuated by rack 123 and held in certain positive locations by an indexing plate locating plunger 124 and an indexing plate 125. The various positions of the locating plate shaft 120 and plate 125 are controlled by the path of the cam 126 which moves the rack 123 by means of the cam roller 127. The indexing plate locating plunger 124 is operated by means of a cam 128 and synchronizes with the operation of cam 126 so that the indexing plate locating plunger 124 is withdrawn before the locating platten shaft 120 begins to rotate and is returned after the necessary arc of rotation is completed. The last described indexing assembly is self-contained and is securely mounted on the indexing table 55 and around the center bar support or hollow stantion 25 of the machine and can be removed or changed to suit engineering or model changes. A cam roller 129 is rotatably mounted on the end of the indexing plate locating plunger 124 for operation of the latter by means of the cam 128.

As many changes could be made in the above described constructions and many apparently widely different embodiments of this invention could be had without departing from the spirit thereof, it is intended that all matter contained in the above description or shown in the accompanying drawings shall be interpreted as illustrative and not in a limiting sense.

What is claimed is:

1. In a multiple spindle metal cutting machine, the combination of a base, a center bar mounted for vertical reciprocation on said base, a work supporting table on said base, a mushroom head on said center bar, a plurality of spindles mounted on said mushroom head and extending downwardly therefrom, spindle driving mechanism leading from said base upwardly through said center bar and through said mushroom head to said spindles, guide means extending downwardly from adjacent the periphery the mushroom head to said base for preventing relative rotation therebetween, and means in said base for raising and lowering said mushroom head at any desired rate whereby to feed tools carried by spindles depending from said head to work carried on said table.

2. In a multiple spindle metal cutting machine, the combination of a base, a center bar mounted for vertical reciprocation on said base, means in said base for vertically reciprocating said center bar, a mushroom head on said center bar, a plurality of spindles mounted on said mushroom head and extending downwardly therefrom, spindle driving mechanism leading from said base upwardly through said center bar and through said mushroom head to said spindles, guide means extending downwardly from adjacent the periphery of said mushroom head to said base for preventing relative rotation therebetween, a plurality of spindles mounted on said base, and feeding mechanism for said last-named spindles including as an element thereof said guide means, such feeding mechanism causing feeding operation of said last-named spindles in synchronism with the reciprocation of said center bar and said mushroom head.

3. In a multiple spindle metal cutting machine, the combination of a base, a center bar mounted for vertical reciprocation on said base, means in said base for vertically reciprocating said center bar, a mushroom head on said center bar, a plurality of spindles mounted on said mushroom head and extending downwardly therefrom, spindle driving mechanism leading from said base upwardly through said center bar and through said mushroom head to said spindles, guide means extending downwardly from said mushroom head to said base for preventing relative rotation therebetween, a plurality of spindles mounted on said base, feeding mechanism for said last-named spindles including as an element thereof said guide means, said feeding mechanism causing feeding operation of said last-named spindles in synchronism with reciprocation of said center bar and said mushroom head, and separable friction means included in said feeding mechanism for setting the position of advance of said last-named spindles with relation to that of the center bar and mushroom head.

4. In a multiple spindle metal cutting machine, the combination of a base, a center bar mounted for vertical reciprocation on said base, means in said base for vertically reciprocating said center bar, a mushroom head on said center bar, a plurality of spindles mounted on said mushroom head and extending downwardly therefrom, spindle driving mechanism leading from said base upwardly through said center bar and through said mushroom head to said spindles, guide means extending downwardly from said mushroom head to said base for preventing relative rotation therebetween, a plurality of spindles mounted on said base, feeding mechanism for said last-named spindles including as an element thereof said guide means, such feeding mechanism causing feeding operation of said last-named spindles in synchronism with reciprocation of said center bar and said mushroom head, and separable positive clutch means included in said feeding mechanism for setting the position of advance of said last-named spindles with relation to that of the center bar and mushroom head.

5. In a multiple spindle metal cutting machine, the combination of a base, a center bar mounted for vertical reciprocation on said base, means in said base for vertically reciprocating said center bar, a mushroom head on said center bar, a plurality of spindles mounted on said mushroom head and extending downwardly therefrom, spindle driving mechanism leading from said base upwardly through said center bar and through said mushroom head to said spindles, guide means extending downwardly from said mushroom head to said base for preventing relative rotation therebetween, a plurality of spindles mounted on said base, feeding mechanism for said last-named spindles including as an element thereof said guide means, said feeding mechanism causing feeding operation of said last-named spindles in synchronism with reciprocation of said center bar and said mushroom head and separable positive clutch means comprising a pair of positively engageable clutch members, a shaft on which one member is slidably splined and the other member rotatably journaled, and means for locking such clutch members in engagement with each other.

6. In a multiple spindle metal cutting machine, the combination of a base, a center bar mounted for vertical reciprocation on said base, means on said base for vertically reciprocating said center bar, a mushroom head on said center bar, a plurality of spindles mounted on said mushroom head and extending downwardly therefrom, spindle driving mechanism leading from said base upwardly through said center bar and through said mushroom head to said spindles, guide means extending downwardly from said mushroom head to said base for preventing relative rotation therebetween, an indexing table rotatably mounted on said base, means synchronized with the reciprocation of said center bar for indexing said table, a second indexing mechanism carried by said indexing table and including a work holding fixture, and cam means fixed to said base for operating said table mounted indexing mechanism upon indexing operation of said indexing table.

7. In a multiple spindle and metal cutting machine, the combination of a base, a center bar mounted for vertical reciprocation on said base, an indexing table rotatably mounted on said base on the same vertical axis as said center bar, a mushroom head on said center bar, a plurality of spindles mounted on said mushroom head and extending downwardly therefrom, spindle driving mechanism leading from said base upwardly through said center bar and through said mushroom head to said spindles, guide means extending downwardly from adjacent the periphery of said mushroom head to said base for preventing relative rotation therebetween, means for raising and lowering said mushroom head at a desired rate whereby to feed tools carried by spindles depending downwardly from said head to work carried on said table, and means synchronized with the reciprocation of said center bar for indexing said table.

8. In a multiple spindle metal cutting machine, the combination of a base, a center bar mounted for vertical reciprocation on said base, means in said base for vertically reciprocating said center bar, a mushroom head on said center bar, means for preventing relative rotation between said mushroom head and said base, a plurality of spindles mounted on said base, feeding mechanism causing feeding operation of the said spindles, and means carried by said mushroom head engaging said spindle feeding mechanism for actuating the same in synchronism with the reciprocation of the said center bar and said mushroom head.

9. In a multiple spindle metal cutting machine, the combination of a base, a center bar mounted for vertical reciprocation on said base, means in said base for vertically reciprocating said center bar, a mushroom head on said center bar, a plurality of spindles mounted on said mushroom head and extending downwardly therefrom, spindle driving mechanism leading from said base upwardly through said center bar and through said mushroom head to said spindles, guide means for preventing relative rotation of said mushroom head with respect to said base, a plurality of spindles mounted on said base, feeding mechanism for said last-named spindles, and means carried by said mushroom head engaging said spindle feeding mechanism for causing feeding operation of said last-named spindles in synchronism with the reciprocation of the said center bar and said mushroom head.

10. In a multiple spindle metal cutting machine, the combination of a base, a center bar mounted for vertical reciprocation on said base, means in said base for vertically reciprocating said center bar, a plurality of spindles mounted on said mushroom head and extending downwardly therefrom, spindle driving mechanism leading from said base upwardly through said center bar and through said mushroom head to said spindles, feeding mechanism for said last-named spindles, and means carried by said mushroom head for engaging said spindle feeding mechanism causing the feeding operation of said last-named spindles responsive to the reciprocation of said center bar and said mushroom head.

WILLIAM SINCLAIR.